United States Patent [19]

Koike

[11] 4,132,975

[45] Jan. 2, 1979

[54] MAJORITY DECISION DEVICE

[75] Inventor: Nobuhiko Koike, Tokyo, Japan

[73] Assignee: Nippon Electric Co., Ltd., Tokyo, Japan

[21] Appl. No.: 845,083

[22] Filed: Oct. 25, 1977

[30] Foreign Application Priority Data

Oct. 27, 1976 [JP] Japan .................. 51-129902

[51] Int. Cl.² ........................................... G06F 11/08
[52] U.S. Cl. ....................................... 340/146.1 BA
[58] Field of Search ............... 340/146.1 BA; 325/41; 307/211

[56] References Cited

U.S. PATENT DOCUMENTS

| | | | |
|---|---|---|---|
| 3,639,901 | 2/1972 | Mitchell | 307/211 X |
| 3,737,577 | 6/1973 | Birkin | 340/146.1 BA X |
| 3,863,215 | 1/1975 | McGrogan, Jr. | 340/146.1 BA |

*Primary Examiner*—Jerry Smith
*Attorney, Agent, or Firm*—Sughrue, Rothwell, Mion, Zinn and Macpeak

[57] ABSTRACT

A majority decision circuit is disclosed having reduced shift register bit capacity and the capability of providing a majority decision for varying repetition number. A full adder is used and the data words are applied serially to the carry input. The output is applied via shift registers back to the input, and a bias value is applied to the second input. The carry-out bits of the adder represent the majority decision.

2 Claims, 5 Drawing Figures

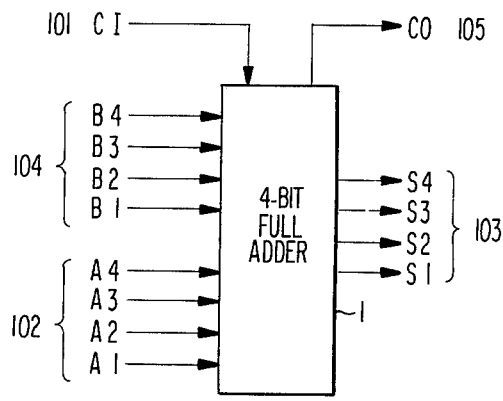
FIG.3
FIG.4
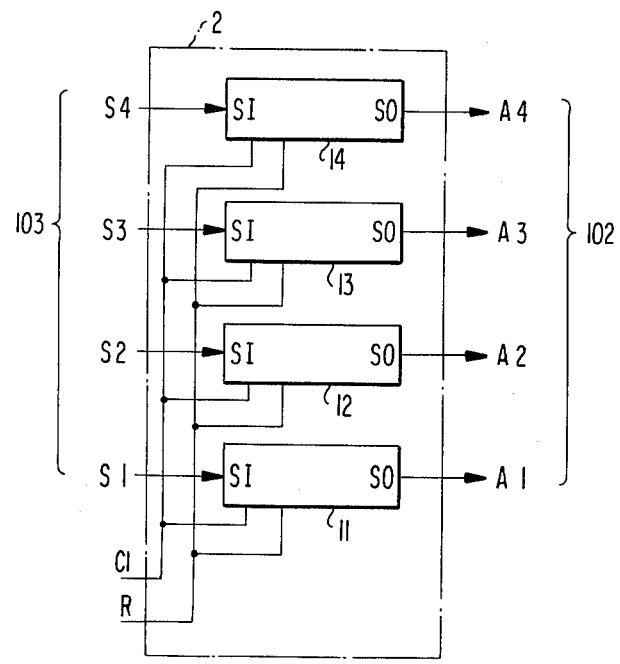
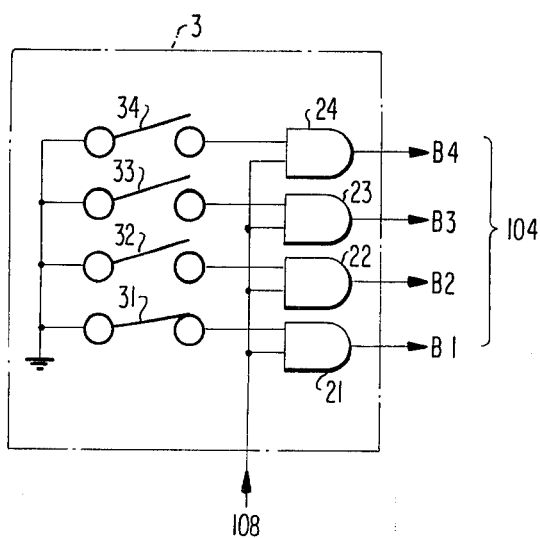
FIG.5

MAJORITY DECISION DEVICE

BACKGROUND OF THE INVENTION

The present invention relates to a majority decision device adapted for making a majority decision with respect to repeatedly and serially received data words.

In mobile telecommunication and similar wireless communications, the accurate reception of data frequently becomes difficult due to various phenomena such as fading, etc. To overcome this difficulty, it has been conventional to transmit the same data word repeatedly and, on the receiver side, to make a majority decision on the received group of data words.

In a conventional system for effecting majority decision, the total data words received during the repeated cycles are stored in a shift register or the like, and the corresponding bits in the respective data words are taken out concurrently to be judged whether it is "0" or "1" by means of a decision circuit. However, such prior art system involves many problems such that the capacity required for the shift register increases in proportion to the repetition number of the data word transmission, and that according to the increase of the repetition number, the expansion of the decision circuit is hardly feasible.

Such a conventional decision circuit in the prior art is described in "5-Input Majority Gates" on page 7-242 of "THE SEMICONDUCTOR DATA LIBRARY, SERIES A, VOLUME V" published in 1957 by MOTOROLA INC.

SUMMARY OF THE INVENTION

An object of the present invention is, therefore, to provide a majority decision device readily adaptable for the increase of the repetition number of the same data word transmission with a minimum increase in hardware.

The present device comprises a group of shift registers for storing an intermediately processed result for repeatedly and serially received data words, a full adder adapted to carry out the addition of parallel output signals of the shift register group serving as one addition input and of said received data word serving as a carry input, and bias value setting means for applying a bias value to the other addition input of said full adder to make a majority decision based on carry output signals sequentially given from said full adder by allowing said full adder to overflow in order to determine whether it is "0" or "1" depending on the repeatedly given number of said data words.

BRIEF DESCRIPTION OF THE DRAWINGS

FIG. 3 shows a block diagram of a full adder used in the present invention.

FIG. 4 shows a block diagram of a group of shift registers used in the present invention.

FIG. 5 schematically illustrates bias setting means in the present invention.

DETAILED DESCRIPTION OF THE PREFERRED EMBODIMENTS

Figure 1:
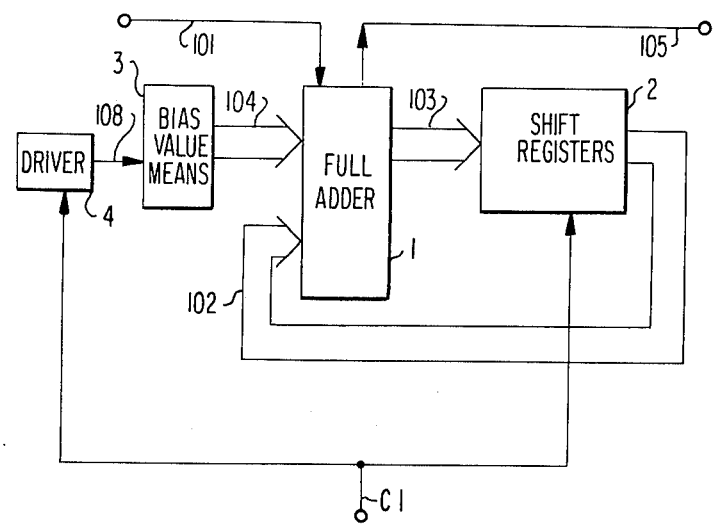
FIG. 1 shows a block diagram of one embodiment of the present invention.

Referring to FIG. 1, the present device is comprised of a full adder 1, a group of shift registers 2, and bias value setting means. Reference numeral 101 designates a received data input signal serving as a carry input signal of the full adder 1. Reference numeral 102 designates parallel output signals given from the shift register group 2 serving as one addition input of the full adder 1. Reference numeral 103 designates parallel sum output signals fed from the full adder 1 serving as input signals to the shift register group 2. Reference numeral 104 designates a bias value set by the bias value setting means 3, which is applied to the other addition input of the full adder 1. Reference numeral 105 designates a majority decision output signal used as a carry output signal of the full adder 1. A driver circuit 4 for the setting means 3 consists of a counter having a capacity of (the number of data words given repeatedly − 1) × (the number of bits in one data word), which is reset and simultaneously provides an output signal 108 when it has counted reference clocks C1 up to a predetermined number.

To explain the operation of the present device, it is assumed that the repetition number of the data word transmission is 3 and the length of each data word given is 4 bits.

Figure 2:
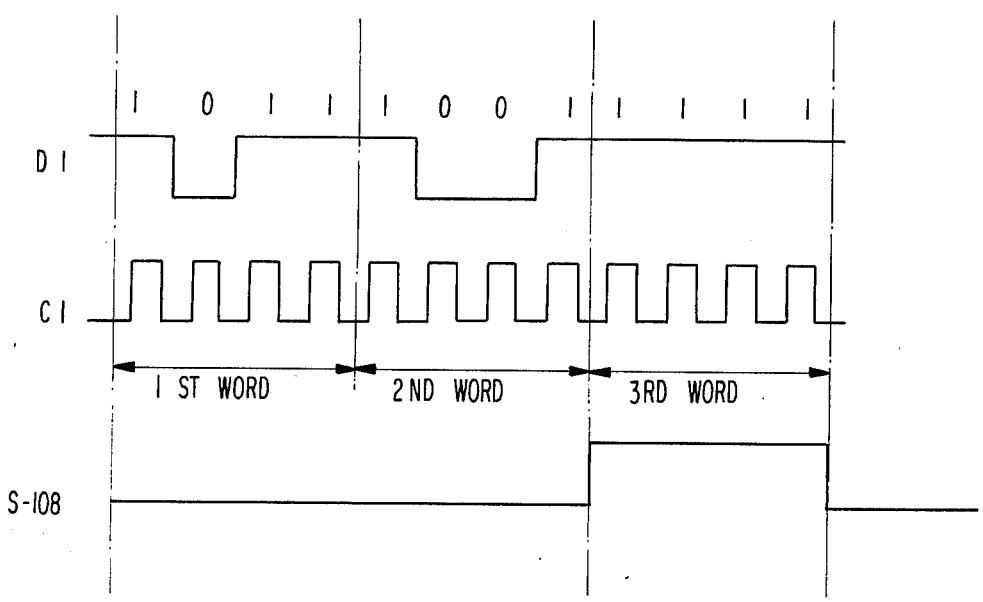
FIG. 2 shows one example of received data for the sake of explanation of the present invention.

A series of received data words are illustrated at D1 in FIG. 2. It is assumed that the data word "1011" was transmitted three times, but due to noise in the transmission path or for any other reason, the second transmitted data word is received in the form of "1001" with an error at the third bit, and the third transmitted data word is received in the form of "1111" with an error at the second bit. According to the principle of majority decision, bit values at the corresponding bit positions in the received data words are compared with each other, and depending on the bit occupying the majority the result is determined as "0" or "1". According to another majority-decision method, all the received data words are added for every bit position, and for every bit position the result is determined as "1" or "0" depending on whether each sum at the respective bit positions is larger or smaller than one-half of the repetition number of the data word transmission. For instance, according to the latter method, the three repeated data words "1011", "1001" and "1111" are added for every bit position, the result of addition for each bit are added for every bit position, the result of addition for each bit position is compared with 3/2. If the result is larger than 3/2, the decision is made as "1", while if the result is smaller than 3/2, the decision is made as "0", whereby the result of majority decision is obtained to be "1011" as shown in the following calculation:

| | | | |
|---|---|---|---|
| 1 | 0 | 1 | 1 |
| 1 | 0 | 0 | 1 |
| +1 | 1 | 1 | 1 |
| 3 | 1 | 2 | 3 |
| ↓ | ↓ | ↓ | ↓ |
| 1 | 0 | 1 | 1 |

A waveform S-108 of FIG. 2 shows the output signal 108 of the driver circuit 4. In the above-assumed case, the counter forming the driver circuit 4 is composed of an octal [(3−1) × 4 = 8] counter so that it may count reference clocks C1 up to 8 and then give the output signal 108.

In FIG. 3 which shows a 4-bit full adder 1, reference characters A1 to A4 and B1 to B4, respectively, represent the first parallel addition input signals 102 and the second parallel addition input signals 104 of FIG. 1, reference characters S1 to S4 represent the parallel sum output signals 103 of FIG. 1, reference character CI represents the carry input signal 101 of FIG. 1 and reference character CO represents the carry output signal 105 of FIG. 1.

In FIG. 4, reference numerals 11, 12, 13 and 14 designate 4-bit shift registers all having identical structure, reference character SI represents a serial input signal, while reference character SO represents a serial output signal, and as a shift clock, the reference clock CI is given to the respective shift registers. Reference character R represents a clear terminal for the shift register group 2. By means of shift registers 11, 12, 13 and 14, data words having a repetition number as high as 16 ($=2^4$) can be handled.

The full adder 1 and the shift register group 2 mentioned before can be realized by the 4-BIT BINARY FULL ADDER AND 4-BIT SHIFT REGISTERS disclosed on pages 199 and 235, respectively, of "The TTL Data Book for Design Engineers, First Edition" published in 1973 by TEXAS INSTRUMENTS INCORPORATED.

In FIG. 5, which shows the bias value setting means 3 of FIG. 1 in more detail, the reference numerals 31, 32, 33 and 34 represent a group of switches for selecting a bias value, reference numerals 21, 22, 23 and 24 represent a group of AND-gates, and reference numeral 108 designates a gate control input signal (or, in other words, output signal of the circuit 4) to open the AND gate group (21 to 24) so that a value selected by the switch group (32 to 34) may be given as the second parallel addition input signals B1 to B4. In the example of FIG. 5, the bias value is set at "14", i.e., "1110" in the binary expression.

Now the operation of the present device illustrated in FIG. 1 in case where the data words shown in FIG. 2 are given, will be described with reference to FIGS. 3 to 5.

In the initial state all the shift registers 11 to 14 of FIG. 4 are cleared by applying a clear signal thereto via the clear terminal R. The received data D1 (FIG. 2) is serially conveyed to the full adder 1 as a carry input signal. The full adder 1 (FIG. 3) adds the carry input signal 101 and the first and second parallel input signals 102 and 104, and produces the parallel sum output signals 103. During the first word period as shown in FIG. 2, both the first and second parallel input signals 102 and 104 are "0000" at every reference clock CI so that the received data word is given directly to the shift register 11 in the shift register group 2 of FIG. 4 and shifted therein without being altered in its contents in synchronism with every reference clock C1. In other words, immediately after the first data word "1011" is completely sent to the shift register group 2, in the respective registers 14, 13, 12 and 11 are held the following bit patterns as viewed in FIG. 4:

| | | | | | |
|---|---|---|---|---|---|
| (14) → SI | 0 | 0 | 0 | 0 | SO → |
| (13) → SI | 0 | 0 | 0 | 0 | SO → |
| (12) → SI | 0 | 0 | 0 | 0 | SO → |
| (11) → SI | 1 | 1 | 0 | 1 | SO → |

Subsequently, the second data word "1001" is applied to the carry input and added with the parallel output signals 102 and 104. When the second data word "1001" has been completely given to the full adder 1 and the parallel addition output signals 103 have been given to the shift register group 2, the bit patterns in the respective registers 14, 13, 12 and 11 will be:

| | | | | | |
|---|---|---|---|---|---|
| (14) → SI | 0 | 0 | 0 | 0 | SO → |
| (13) → SI | 0 | 0 | 0 | 0 | SO → |
| (12) → SI | 1 | 0 | 0 | 1 | SO → |
| (11) → SI | 0 | 1 | 0 | 0 | SO → |

Therefore, in the shift register group 2 is stored an intermediate result "2012" equal to the sum of the received first data word "1011" and the received second data word "1001". This sum is obtained by making an addition at the corresponding binary (or digit) positions individually using the second word "1001" as the input carry signal 101. Here, it is to be noted that the order of digits in each register is opposite to that of digits in each data word appearing in the received data series as shown at D1 in FIG. 2, and that the register 14 corresponds to the most significant binary digit position, the register 13 to the second most significant binary digit position, 12 to the third most significant binary digit position and 11 to the least significant binary digit position.

Finally, upon input of the third data word "1111", the gate control output signal 108 for the bias value setting means 3 of FIG. 5 is enabled as shown at S-108 in FIG. 2. As a result, a bias value "14", i.e., "1110" in the binary form is given from the setting means 3 as the output signals 104 (B1 to B4). The bias value "1110" is added with the first parallel addition input signals 102 fed from the shift register group 2 and the input carry signal 101 (the third data word "1111") in the adder 1. Here, it should be noted that this bias value is set according to the following equation:

$$\text{Bias Value} = 2^K - 1 - N/[2]$$

where K represents the bit length of the full adder 1, and the symbol $N/[2]$ represents the largest integer not exceeding half of the repetition number N of the data word transmission. In the above example, since $K = 4$ and $N = 3$ are assumed, the bias value is set at $2^4 - 1 - 3/[2] = 16 - 1 - 1 = 14$. Accordingly, when the third data word "1111" is given, the addition of modulo 16 is carried out in the full adder 1 for the respective digit positions of the data word in the following manner:

```
 "2 0 1 2"           the intermediate result stored in the
                     shift register group 2 (first parallel
                     addition input signals)
 "1 1 1 1"           the third received data word (carry
                     input signal)
+ -14 14 14 14"      the bias value (second parallel addition
                     input signals)
  17 15 16 17
   ↓  ↓  ↓  ↓
   1 15  0  1        parallel sum (modulo 16) output signals
   1  0  1  1        carry output signal
```

From the above-mentioned calculation, it will be seen that when the addition result becomes equal to or larger than 16, an overflow arises resulting in a carry output signal "1 , and so the desired majority-decision output word can be obtained by the series of the carry output signals 105 given from the full adder 1, that is, in the assumed case, the majority decision word "1011" is produced. The bit patterns in the respective shift registers of FIG. 4 at this final stage are supplementarily shown with the sum output signals of 1→0→15→1:

| | | | | | |
|---|---|---|---|---|---|
| (14) → SI | 0 | 0 | 1 | 0 | SO → |
| (13) → SI | 0 | 0 | 1 | 0 | SO → |
| (12) → SI | 0 | 0 | 1 | 0 | SO → |
| (11) → SI | 1 | 0 | 1 | 1 | SO → |

As is apparent from the foregoing, the first advantage of the present invention lies in that the capacity of the shift register for storing a series of received data words can be greatly reduced by employing a full adder compared with the prior art system requiring a shift register of M × N bits where N represents the repetition number of the data word transmission and M represents the bit number in one word (this is in clear contrast to the present device requiring a shift register of only M × $\log_2$ N bits ( < MN bits). Secondly, the conventional decision circuit becomes unnecessary in the present device because a carry output signal fed from a full adder is in itself used as a result signal of the majority decision. Thirdly, the same circuit arrangement is readily adaptable for the change of the repetition number N of the received data words by merely varying the bias setting value using the bias value setting means.

In other words, the four 4-bit shift registers 11 to 14 in the illustrated embodiment are not needed for the assumed values of M = 4 and N = 3, but only two (the smallest integer equal to or larger than $\log_2 3$) shift registers can satisfactorily achieve the necessary function. However, the illustrated embodiment includes four 4-bit registers for the purpose of allowing increase of the repetition number N of the data word transmission up to N = $2^4$ = 16.

Furthermore, it is to be noted that while the addition of the bias value is carried out concurrently with the final addition of the repeated input data words in the above-described embodiment, the present invention is not limited to such an operation mode, as will be obvious from the above description.

What is claimed is:

1. A majority decision device in a system of the type wherein a data word of M bits is serially and repeatedly received a given number of times N, comprising:
   a plurality of parallel shift registers, each having a bit length equal in number to the length of said received data word, said plurality being the smallest integer equal to or exceeding $\log_2$ N; a full adder having parallel output signals from said shift registers applied thereto as first addition input signals; means for setting a predetermined bias value at second parallel addition input terminals of said full adder, means for serially applying said received data words as a carry input signal to said full adder, the parallel sum output signals obtained from said full adder being connected to said plurality of shift registers, wherein each time said data word is received, said data word is added with the parallel output signals given from said shift register group and the result signals are again fed to said shift register group, said addition being repeated N × M times, and after said bias value has been added to the adder, a carry signal from full adder constituting the majority decision-data.

2. A majority decision circuit adapted to receive N repetitions of a data word input, said data word having length M, and to provide an output majority decision word, said decision circuit comprising:
   a K-bit full parallel adder for adding first, second and carry inputs and providing sum and carry outputs, where K is an integer equal to or larger than $\log_2$ N,
   an K × M shift register means having inputs of K bits connected to receive said sum outputs of said full adder and outputs of K bits connected as the first input to said K-bit full parallel adder,
   connection means for serially applying said N data words to said carry input of said full adder, and
   bias means for applying to said second input of said full adder the value 0 when said first N-1 of said data words are being applied to said full adder and the value $2^K - 1 - (\overline{N/2})$ when the Nth data word is being applied to said full adder where $\overline{N/2}$ is the largest integer not exceeding N/2,
   the output on said carry output of said full adder constituting said majority decision word.

* * * * *

UNITED STATES PATENT AND TRADEMARK OFFICE
CERTIFICATE OF CORRECTION

PATENT NO. : 4,132,975                              Page 1 of 3

DATED : January 2, 1979

INVENTOR(S) : Nobuhiko KOIKE

It is certified that error appears in the above–identified patent and that said Letters Patent are hereby corrected as shown below:

Column 2, lines - delete "

|   |   |   |   |
|---|---|---|---|
| 1 | 0 | 1 | 1 |
| 1 | 0 | 0 | 1 |
| +1 | 1 | 1 | 1 |
| 3 | 1 | 2 | 3 |
| ↓ | ↓ | ↓ | ↓ |
| 1 | 0 | 1 | 1 |

52-58

"

insert --

|   |   |   |   |
|---|---|---|---|
| 1 | 0 | 1 | 1 |
| 1 | 0 | 0 | 1 |
| +1 | 1 | 1 | 1 |
| 3 | 1 | 2 | 3 |
| ↓ | ↓ | ↓ | ↓ |
| 1 | 0 | 1 | 1 |

--

UNITED STATES PATENT AND TRADEMARK OFFICE
CERTIFICATE OF CORRECTION

PATENT NO. : 4,132,975
DATED : January 2, 1979
INVENTOR(S) : Nobuhiko KOIKE

It is certified that error appears in the above-identified patent and that said Letters Patent are hereby corrected as shown below:

Column 3, line 10 - delete "CI" insert -- C1 -- line 49 - delete "CI" insert -- C1 --

Column 4, lines 48-58 - delete "_____"

| | | | | |
|---|---|---|---|---|
| | " 2 | 0 | 1 | 2 " |
| | " 1 | 1 | 1 | 1 " |
| + | -  | 14 | 14 | 14  14 " |
| | 17 | 15 | 16 | 17 |
| | ↓ | ↓ | ↓ | ↓ |
| | 1 | 15 | 0 | 1 |
| | 1 | 0 | 1 | 1 |

UNITED STATES PATENT AND TRADEMARK OFFICE
CERTIFICATE OF CORRECTION

PATENT NO. : 4,132,975
DATED : January 2, 1979
INVENTOR(S) : Nobuhiko KOIKE

It is certified that error appears in the above-identified patent and that said Letters Patent are hereby corrected as shown below:

Column 4, lines 48-58  insert --

```
     " 2    0    1    2"
     " 1    1    1    1"
   + "14   14   14   14"
     ─────────────────────
      17   15   16   17
       ↓    ↓    ↓    ↓
       1   15    0    1

1    0    1    1
     ─────────────────────
```
-- line 62 - delete " "1 , " insert -- "1" , --

Signed and Sealed this

Twenty-fourth Day of April 1979

[SEAL]

Attest:

RUTH C. MASON
Attesting Officer

DONALD W. BANNER
Commissioner of Patents and Trademarks